(12) United States Patent
Levy

(10) Patent No.: US 9,480,282 B2
(45) Date of Patent: Nov. 1, 2016

(54) FEED DEVICE FOR LINEAR AIRFLOW SEPARATOR

(71) Applicant: Sam Levy, Chesterfield, VA (US)

(72) Inventor: Sam Levy, Chesterfield, VA (US)

(73) Assignee: Evans MacTavish Agricraft, Inc., Wilson, NC (US)

( * ) Notice: Subject to any disclaimer, the term of this patent is extended or adjusted under 35 U.S.C. 154(b) by 286 days.

(21) Appl. No.: 13/955,135

(22) Filed: Jul. 31, 2013

(65) Prior Publication Data

US 2015/0037104 A1 Feb. 5, 2015

(51) Int. Cl.
*B65G 53/48* (2006.01)
*A24B 3/16* (2006.01)
*B07B 4/02* (2006.01)
*B07B 13/16* (2006.01)

(52) U.S. Cl.
CPC . *A24B 3/16* (2013.01); *B07B 4/02* (2013.01); *B07B 13/16* (2013.01); *Y02P 70/66* (2015.11)

(58) Field of Classification Search
USPC .......... 209/147, 627, 644, 639, 932; 406/71, 406/115, 144, 194; 15/348, 354, 303, 15/306.1; 239/292, 301, 467; 226/97.1, 226/97.2, 97.3; 241/38, 39; 131/318
See application file for complete search history.

(56) References Cited

U.S. PATENT DOCUMENTS

| | | | |
|---|---|---|---|
| 3,608,716 A | 9/1971 | Rowell et al. | |
| 3,865,149 A * | 2/1975 | Keldany | D03D 47/00 139/452 |
| 3,865,298 A * | 2/1975 | Allen | B23K 1/008 118/63 |
| 3,924,794 A * | 12/1975 | Allen | B23K 1/20 228/256 |
| 4,037,290 A * | 7/1977 | Rose | A47L 5/14 15/340.1 |
| 4,103,720 A * | 8/1978 | Eisenberg | B65B 3/26 141/1 |
| 4,302,134 A * | 11/1981 | Johnson, Jr. | B65G 51/02 198/381 |
| 4,359,964 A * | 11/1982 | Johnson | D21H 25/16 118/249 |
| 4,405,126 A * | 9/1983 | Frye | B65H 29/58 198/438 |
| 4,664,308 A * | 5/1987 | Boynton | B23K 1/085 118/63 |
| 4,701,256 A | 10/1987 | Cross, Jr. | |
| 4,726,502 A * | 2/1988 | Cryderman | B65H 20/14 162/193 |
| 4,774,969 A | 10/1988 | Goldbach et al. | |
| 4,889,138 A | 12/1989 | Heitmann et al. | |
| 4,998,540 A | 3/1991 | Brand | |

(Continued)

*Primary Examiner* — Joseph Dillon, Jr.

(57) ABSTRACT

A feed device for a linear airflow separator that eliminates the use of a winnower in the separation of tobacco products. The feed device includes an adjustable angle baffle deflector in combination with an air knife. The air-fed adjustable angle baffle deflector feeds with non-product contact and as a result does not lead to mechanical degradation of the treated material. The air knife is fed with air from a high pressure blower having a variable frequency drive. The feed device treats the product with air only, thereby eliminating mechanical contact with the product and resulting in higher separation yields and higher operating efficiency than conventional recirculating pneumatic separators.

14 Claims, 4 Drawing Sheets

(56) References Cited

U.S. PATENT DOCUMENTS

| | | | | |
|---|---|---|---|---|
| 5,005,250 A * | 4/1991 | Trautmann | F26B 21/004 | 15/309.2 |
| 5,010,619 A * | 4/1991 | Lisec | B05B 1/005 | 15/302 |
| 5,074,242 A * | 12/1991 | Bricmont | B05C 11/06 | 118/63 |
| 6,059,893 A * | 5/2000 | Kawasaki | B08B 5/02 | 134/21 |
| 6,244,075 B1 * | 6/2001 | Patel | D04H 1/70 | 19/304 |
| 6,260,231 B1 * | 7/2001 | Bybee | F26B 5/14 | 15/309.2 |
| 6,260,712 B1 * | 7/2001 | Flottmann | B07B 4/02 | 209/639 |
| 6,267,300 B1 * | 7/2001 | Venema | B05B 7/0869 | 239/290 |
| 6,330,813 B2 * | 12/2001 | Patel | 406/198 | |
| 6,425,512 B2 * | 7/2002 | Hill | D21G 9/0063 | 162/202 |
| 6,554,210 B2 * | 4/2003 | Holt | B05B 7/08 | 239/284.1 |
| 6,702,101 B2 * | 3/2004 | Haruch | F26B 21/004 | 15/306.1 |
| 6,859,974 B2 * | 3/2005 | Haruch | F26B 21/004 | 15/306.1 |
| 7,267,230 B1 * | 9/2007 | Smith | B07B 7/01 | 209/139.1 |
| 7,552,503 B2 * | 6/2009 | Wakao | B08B 3/02 | 134/1 |
| 9,309,060 B2 * | 4/2016 | Pucciani | B65G 47/1407 | |
| 2009/0165238 A1 * | 7/2009 | Bennett | B08B 5/026 | 15/309.1 |
| 2010/0078366 A1 * | 4/2010 | Wark | B07B 1/12 | 209/627 |
| 2011/0068051 A1 * | 3/2011 | Brasseur | B07B 4/02 | 209/137 |

* cited by examiner

FEED DEVICE FOR LINEAR AIRFLOW SEPARATOR

FIELD OF THE INVENTION

The present invention generally relates to the separation of materials of different characteristics from an airstream of conveyed material, and specifically to a feed device for a linear airflow separator including an air nozzle and an adjustable angle baffle deflector that in tandem may be adjusted in angle to improve the quality and method of feeding materials to a linear airflow separator.

BACKGROUND OF THE INVENTION

Recirculating pneumatic separators are commonly used in the separation of tobacco products, such as the separation of threshed tobacco leaves from the heavier tobacco parts such as stems. Conventional recirculating pneumatic separators typically include a winnower as a feed device that imparts a substantial velocity to the particles of material to be fed to the separator. The winnower consists of a rotary impeller with a plurality of vanes rotating at extremely high speeds, typically 500 to 800 rpms. The rapidly rotating vanes physically contact the particles of material to be separated and thereby impart a substantial velocity to the material.

Unfortunately, several negative consequences result from operating a winnower at these high rates of rotation. The direct physical contact of the high speed vanes with the product leads to substantial degradation of the product. The yield of a conventional recirculating pneumatic separator is thus negatively affected by the product degradation. Furthermore, in the processing of tobacco, it is absolutely critical to avoid introducing any foreign matter into the tobacco. Winnowers, running at a high revolution rate, break down frequently and lose portions of their vanes into the tobacco product. Introducing the broken portions of the winnower into the tobacco processing stream is a critical and unacceptable problem in the processing of tobacco.

What is needed is an improved method of separating threshed tobacco leaves from the heavier tobacco parts. The improved separation device and method should preferably reduce the amount of product degradation thereby having a positive effect on separator yield. The method should also eliminate the possibility of contaminating the tobacco product with broken portions of the separator machinery. These improvements are realized by the feed device of the present invention, which eliminates the winnower as a piece of machinery in the separation of tobacco products.

BRIEF SUMMARY OF THE INVENTION

The invention is a feed device for a linear airflow separator that eliminates the use of a winnower in the separation of tobacco products. The feed device includes an adjustable angle baffle deflector in combination with an air knife. The air-fed adjustable angle baffle deflector is designed to feed with non-product contact and therefore does not degrade the treated material. Air is fed to the air knife by a high pressure blower controlled by a variable frequency drive. As compared to conventional separators, the feed device of the present invention eliminates mechanical contact with the product being fed and as a result leads to longer operational life and less frequent breakdowns of equipment. The air feed reduces or actually eliminates the frequent maintenance that is required by conventional feed devices using a winnower to mechanically feed a product.

OBJECTS AND ADVANTAGES OF THE INVENTION

The feed device of the present invention exhibits several advantages over conventional feed devices for recirculating pneumatic separators, including:
1) The feed device eliminates the use of a winnower for imparting velocity to the particles of material to be separated, which eliminates product damage caused by the physical contact of the rapidly rotating vanes of the winnower with the product.
2) As a result of causing less damage to the product, the feed device has a direct positive effect on yields.
3) The feed device is designed to feed with non-product contact, which leads to substantially less degradation of product.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
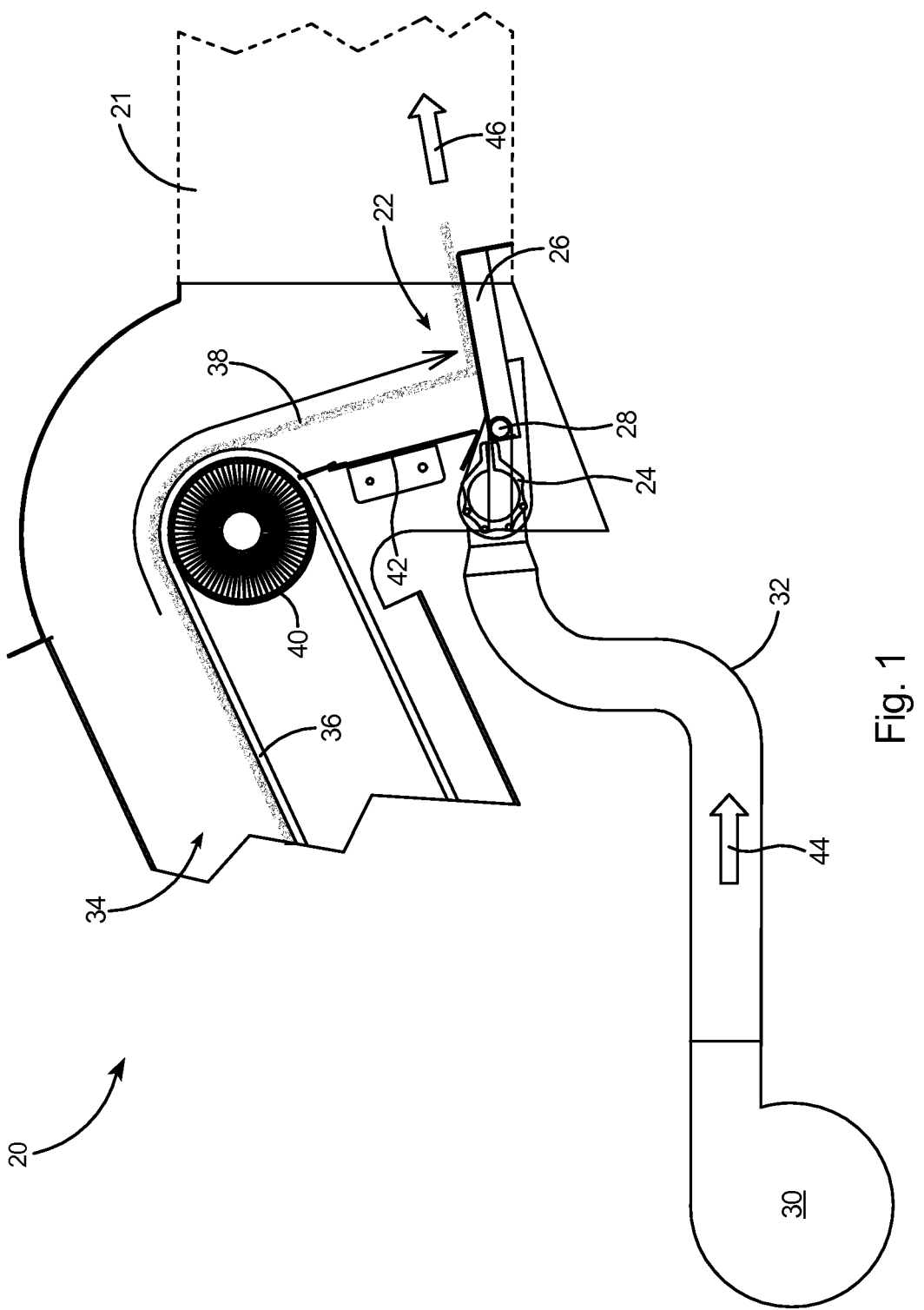
FIG. 1 is a schematic diagram of the preferred embodiment of a feed device for a linear airflow separator, in accordance with embodiments of the invention.

With reference to FIG. 1, there is shown a preferred embodiment of a feed device 20 for a linear airflow separator in accordance with the present invention, of which a portion of the linear airflow separator 21 is shown in dashed lines in the figure. The a feed device 20 includes an air-fed adjustable angle baffle deflector 22 that includes an air knife 24 and a deflector baffle 26 fixed in relation to one another. The air knife 24 and deflector baffle 26 rotate in tandem around a pivot 28. A blower 30 supplies pressurized air to the air knife 24 through flexible hose 32. A transport mechanism in the form of a conveyor 34 with a driven belt 36 delivers clumped tobacco 38 around roll 40, which product falls toward deflector baffle 26. The clumped tobacco product includes tobacco materials of various densities, such as stems and threshed leaves. A fixed baffle 42 extends substantially from the air knife 24 to the lower surface of belt 36 and prevents tobacco from adhering to and the underside of belt 36 as it travels around roll 40. Air is supplied in the direction of arrow 44 to the air knife 24. Tobacco travels along conveyor 34 and is dropped or free falls into the air-fed adjustable angle baffle deflector 22. The air-fed adjustable angle baffle deflector 22 then thrusts the tobacco (or other product) in the direction of arrow 46. The trajectory of the product/airflow is adjustable via rotation of the air-fed adjustable angle baffle deflector 22 around pivot 28. The air knife 24 and the deflector baffle 26 rotate as a unit around pivot 28, that is to say the angle between the two is fixed.

Although a conveyor is shown as the transport mechanism in FIG. 1, other transport mechanisms could also be used to deliver tobacco to the air-fed adjustable angle baffle deflector 22, such as a vibrating conveyor, gravity-fed chute, vibrating chute, separate belt conveyor, screw drive, or a hopper and valve arrangement. It should also be understood that the feed device 20 can be used for separation of products other than tobacco. The purpose of the feed device is to improve the method of feeding tobacco into a classifier, especially in reducing the mechanical damage to the tobacco and in improving the yield of the separation process. Since the feed device feeds product with air, there is no mechanical contact with the tobacco, and this leads to less degradation of material and higher separation efficiencies and yields.

Figure 2:
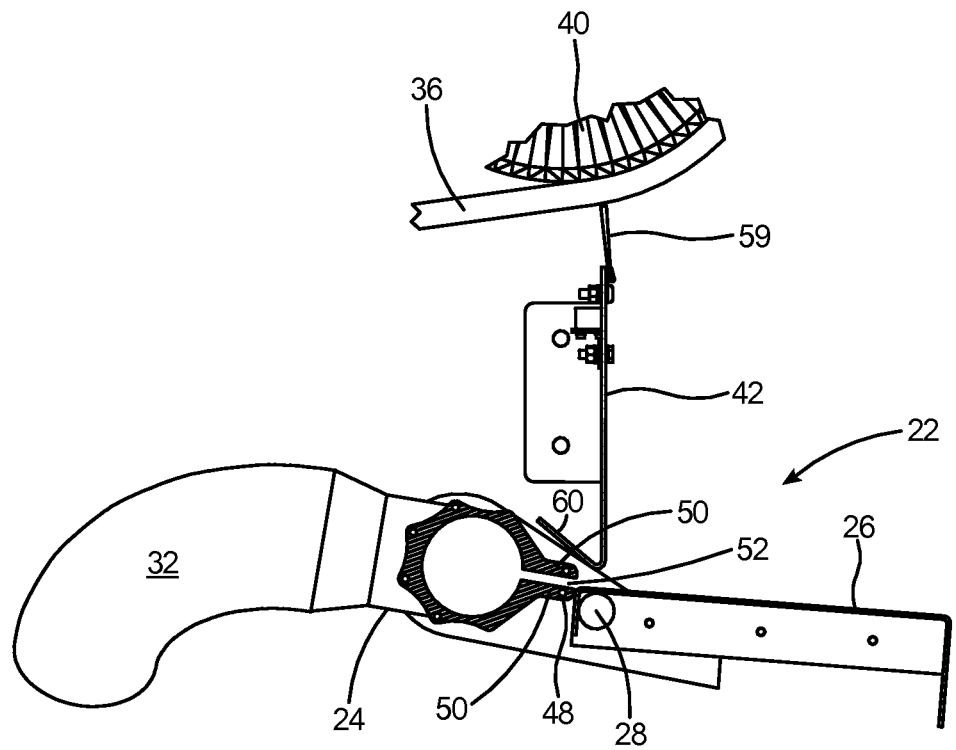
FIG. 2 is a side view of an air-fed adjustable angle baffle deflector that forms a portion of the feed device of FIG. 1.
Figure 3:
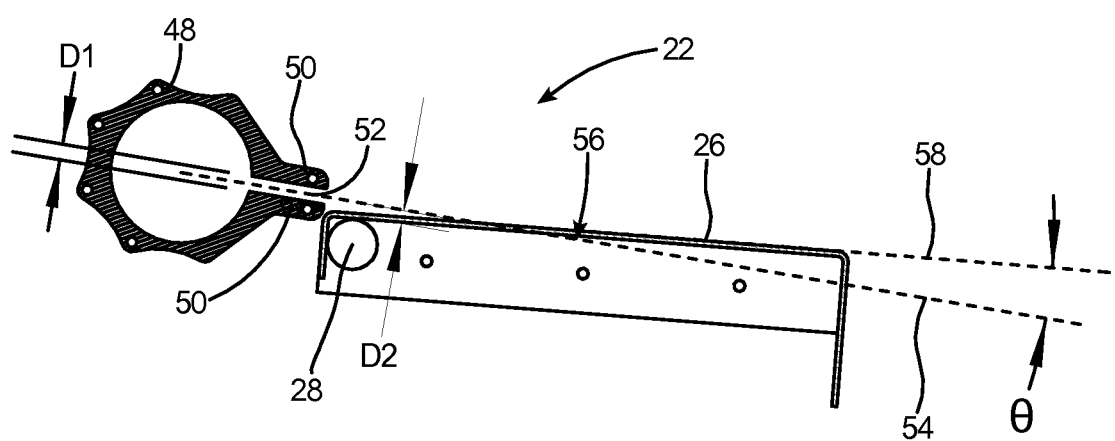
FIG. 3 is a sectional view of the air-fed adjustable angle baffle deflector including the air knife gap.

Referring to FIGS. 2 and 3, according to the preferred embodiment, an air knife 24 and a deflector baffle 26 are fixed in relation to one another to form an air-fed adjustable angle baffle deflector 22. The air knife 24 includes a nozzle 48 that has two tips 50 of hardened metal. As shown in FIG. 3, the tips 50 form an air knife gap 52 that is set to obtain a preferred air stream exiting the gap. The air knife gap 52, denoted by distance D1 in FIG. 3, is preferably set at 0.040 to 0.045 inch. The tips 50 enable adjustment of the air knife gap 52.

As shown in FIG. 3, the air knife gap 52 is aligned along the centerline 54 of the air knife gap 52 and the ramp portion 56 of deflector baffle 26 is aligned along plane 58. The air knife 24 and the deflector baffle 26 are maintained in a fixed relationship to one another and rotate as a unit, or in tandem, to form the air-fed adjustable angle baffle deflector 22. The air knife 24 and the deflector baffle 26 are rotated as a unit around pivot 28 in order to obtain the desired trajectory and distance of the thrust tobacco. The air knife 24 is preferably positioned at a distance above and at an angle with respect to the ramp portion 56 of the deflector baffle 26. The distance above the ramp portion 56 of the deflector baffle 26, as measured from the centerline 54 of the air knife gap 52 to the ramp portion 56 of the deflector baffle 26 as denoted by distance D2 in FIG. 3, is preferably from 0.06 to 0.08 inch. The angle between the air knife 24 and the deflector baffle 26, denoted by θ in FIG. 3, is preferably between 3 and 7 degrees. Most preferably the angle is 5 degrees. The angle between the air knife 24 and the deflector baffle 26 is critical to keep the deflector baffle 26 clear and to properly disperse and thrust the tobacco in order to properly feed the material to a classifier or similar piece of equipment for further processing of the tobacco. Preferably, the air knife is positioned 0.06-0.08 inch above the surface of the deflector and at an angle of 5 degrees with respect to the surface of the deflector baffle 26. In operation, air is provided to the air knife 24 from the blower 30 thereby causing the air to impinge at an oblique angle (see angle θ in FIG. 3) on the ramp portion 56 of the deflector baffle 26.

With reference to FIG. 2, fixed baffle 42 includes a brush 59 extending upward therefrom and a lower leg 60 extending toward the air knife 24. The brush 59 clears driven belt 36 of any tobacco material adhered to the belt, and sends it back toward the air-fed adjustable angle baffle deflector 22. Lower leg 60 of fixed baffle 42 is positioned close to the air knife 24 and prevents tobacco material from traveling toward the air knife.

Figure 4:
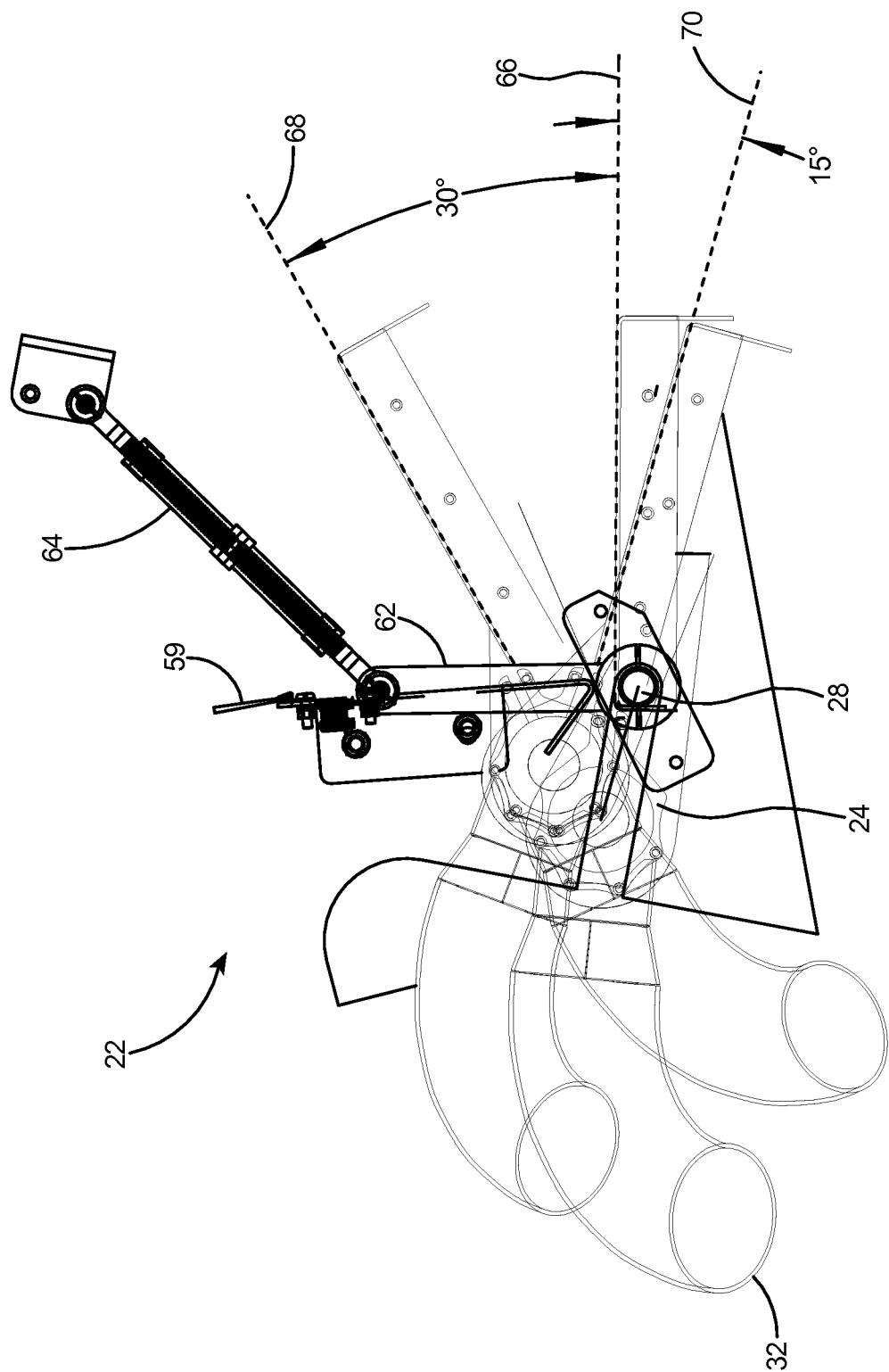
FIG. 4 is a schematic diagram illustrating the degrees of rotation of the air-fed adjustable angle baffle deflector.

Referring to FIG. 4, the air-fed adjustable angle baffle deflector 22 is rotated to a desired position in order to obtain the proper trajectory of the tobacco entering the classifier. This angle is adjusted to compensate for various factors, such as the rate of tobacco being processed and the fraction of high and low density portions. Pivot lever 62, which is attached to pivot 28, and turnbuckle 64 provides a means of rotating the air-fed adjustable angle baffle deflector 22. Rotation of the air-fed adjustable angle baffle deflector 22 is effected by adjusting the turnbuckle 64 manually, which moves pivot lever 62 and in turn rotates the air-fed adjustable angle baffle deflector 22 around pivot 28. The air-fed adjustable angle baffle deflector 22 is normally aligned along neutral plane 66. Most preferably, the air-fed adjustable angle baffle deflector 22 is adapted to rotate up to 30 degrees (+30°) above or up to 15 degrees below (−15°) the neutral plane 66, or a total of 45 degrees of rotation. The extent of rotation is shown by plane 68 for the upper extent and plane 70 for the lower extent of rotation.

Figure 5:
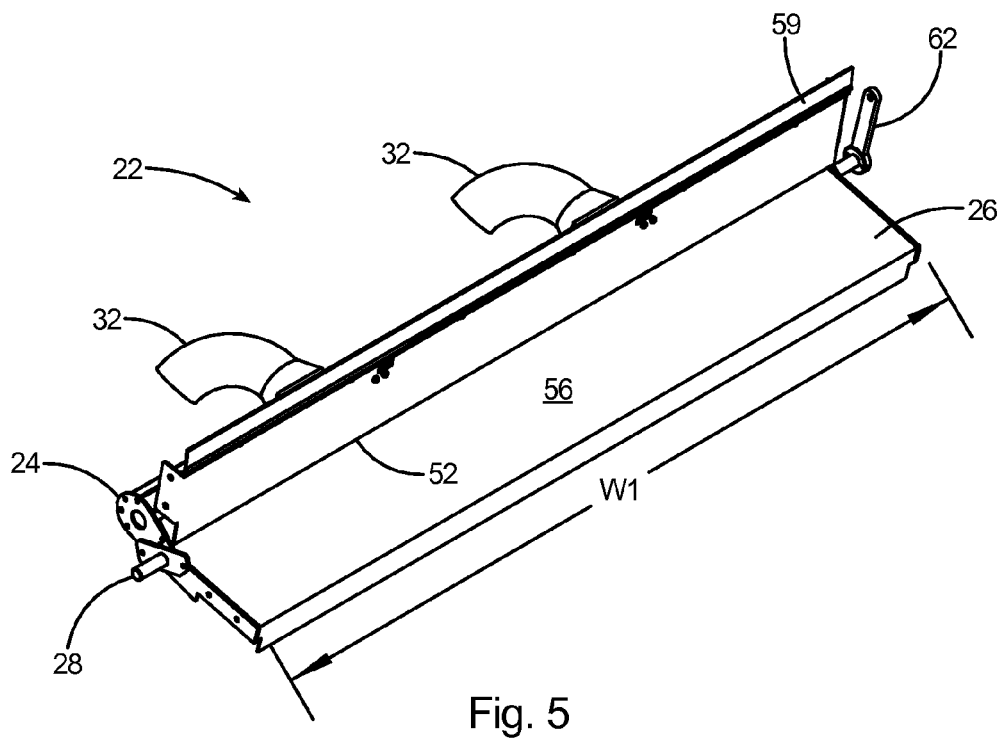
FIG. 5 is a top isometric view of the air-fed adjustable angle baffle deflector.
Figure 6:
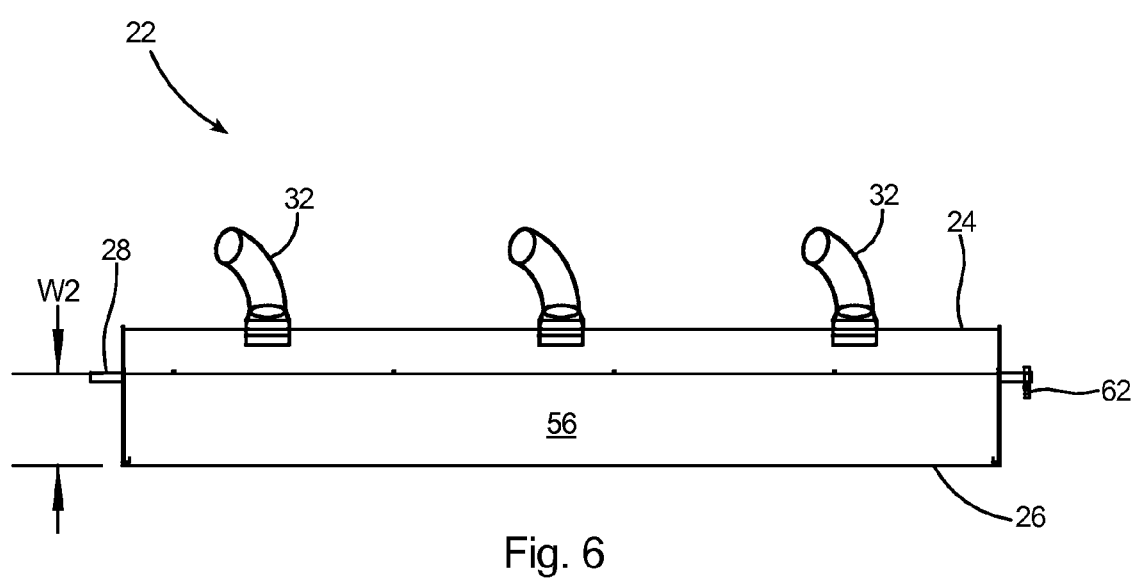
FIG. 6 is a top view of the air-fed adjustable angle baffle deflector.

With reference to FIGS. 5 and 6, the air-fed adjustable angle baffle deflector 22 portion of the feed device is constructed in various machine widths, denoted by dimension W1 in FIG. 5, in order to size the separator for the volume and rate of tobacco that will be treated. The separator 20 and air-fed adjustable angle baffle deflector 22 can be constructed in various lengths, ranging from 36 to 144 inches, in order to accommodate all widths of tobacco separators.

As shown in FIG. 6, the length of the ramp portion 56 of the baffle deflector 26 is critical to the operation of the feed device in order to achieve proper separation of the tobacco. Most preferably, the length of the ramp portion 56 is from 15.15 to 16.5 inches. The blower 30 (see FIG. 1) preferably provides a pressure of 17 psia at a frequency of 60 Hz. The rotational speed of the blower is preferably from 3,600 to 22,000 rpm. Most preferably, the rotational speed of the blower is 3,600 rpm.

Having thus described the invention with reference to a preferred embodiment, it is to be understood that the invention is not so limited by the description herein but is defined as follows by the appended claims. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention.

What is claimed is:

1. A feed device for a linear airflow separator comprising:
   a blower;
   an air-fed adjustable angle baffle deflector including an air knife, a deflector baffle including a ramp portion with a planar top surface, and a pivot at an upstream end of said ramp portion;
   said air knife positioned at a distance above and at an angle with respect to said ramp portion to impinge air on said planar top surface of said adjustable angle baffle deflector;
   said air-fed adjustable angle baffle deflector is rotatable around said pivot;
   a means for delivering a particulate stream onto said planar top surface of said ramp portion; and
   said air knife and said baffle deflector are maintained in a fixed relationship to one another and rotate as a unit to adjust the trajectory of the particulate stream into the linear airflow separator.

2. The feed device of claim 1 wherein said blower is controlled by a variable frequency drive.

3. The feed device of claim 1 wherein said blower includes a rotational speed of 3,600 to 22,000 rpm.

4. The feed device of claim 1 wherein said distance of said air knife above said surface of said ramp portion of said deflector baffle is 0.06 to 0.08 inch.

5. The feed device of claim 1 wherein said angle of said air knife with respect to said ramp portion of said deflector baffle is between 3 and 7 degrees.

6. The feed device of claim 1 wherein said blower includes a pressure of 17 psia at a frequency of 60 Hz.

7. The feed device of claim 1 wherein said ramp portion of said deflector baffle includes a length of 15.15 to 16.5 inches.

8. The feed device of claim 1 wherein said air-fed adjustable angle baffle deflector is adapted to rotate to a total of 45 degrees around said pivot.

9. The feed device of claim 1 wherein
said air-fed adjustable angle baffle deflector includes a neutral plane with respect to said pivot; and
said air-fed adjustable angle baffle deflector is adapted to rotate to 30 degrees above or 15 degrees below said neutral plane.

10. The feed device of claim 1 including
a pivot lever attached to said pivot; and
a turnbuckle for actuating rotation of said air-fed adjustable angle baffle deflector around said pivot.

11. The feed device of claim 1 wherein said air-fed adjustable angle baffle deflector includes a width of 36 to 144 inches.

12. The feed device of claim 1 including a conveyor for feeding material to said ramp portion of said deflector baffle.

13. The feed device of claim 1 wherein said angle of said air knife with respect to said ramp portion of said deflector baffle is 5 degrees.

14. The feed device of claim 1 wherein said air knife includes a gap.

* * * * *